C. W. AIKEN.
MACHINE FOR CUTTING SOAP.
APPLICATION FILED MAY 21, 1907.

970,161.

Patented Sept. 13, 1910.
7 SHEETS—SHEET 1.

Witnesses:
Walter P. Abell
Forest R. Roulstone

Inventor
Charles W. Aiken,
by Wright Brown Quinby & May
Attorneys.

C. W. AIKEN.
MACHINE FOR CUTTING SOAP.
APPLICATION FILED MAY 21, 1907.

970,161.

Patented Sept. 13, 1910.
7 SHEETS—SHEET 2.

C. W. AIKEN.
MACHINE FOR CUTTING SOAP.
APPLICATION FILED MAY 21, 1907.

970,161.

Patented Sept. 13, 1910.
7 SHEETS—SHEET 6.

UNITED STATES PATENT OFFICE.

CHARLES W. AIKEN, OF WEST NEW BRIGHTON, NEW YORK, ASSIGNOR TO HOUCHIN-AIKEN CO., OF BROOKLYN, NEW YORK, A CORPORATION OF NEW YORK.

MACHINE FOR CUTTING SOAP.

970,161.  Specification of Letters Patent.  Patented Sept. 13, 1910.

Application filed May 21, 1907. Serial No. 374,855.

*To all whom it may concern:*

Be it known that I, CHARLES W. AIKEN, of West New Brighton, in the county of Richmond and State of New York, have invented certain new and useful Improvements in Machines for Cutting Soap, of which the following is a specification.

This invention relates to machines for cutting large slabs of soap previously formed by molds or otherwise, and converted into slabs by a slabbing machine. The method of handling the soap, as performed by the machine to which the present invention relates, is approximately the same is that by which the machines now commonly in use operate, but the machine in the present case embodies certain novel features which facilitate the operations, and the interchangeability and adjustment of the various cutting instrumentalities by which cakes of any desired size may be formed.

The novel features of the cutting machine include, first, the two cutting-heads upon which the cutting wires are adjustably strung, second, the mechanisms which transfer a slab of soap first through one and then transversely through the other cutting head, third, mechanism for automatically discontinuing the moving of one transferring pusher and at the same time starting the moving of the transversely movable pusher, and vice versa.

To these ends the machine of the present invention is constructed and operated as illustrated upon the accompanying drawings, and described in the following specification.

On the drawings.

The same reference characters indicate the same parts wherever they occur.

Figure 1:
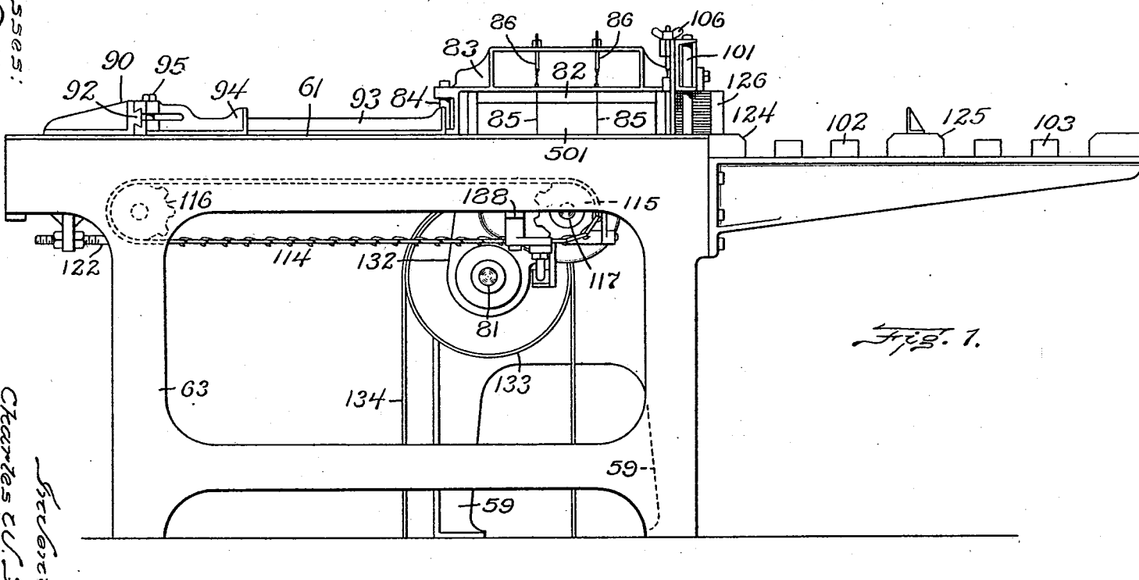
—Figure 1 is an end elevation of the transverse cutting table.
Figure 2:
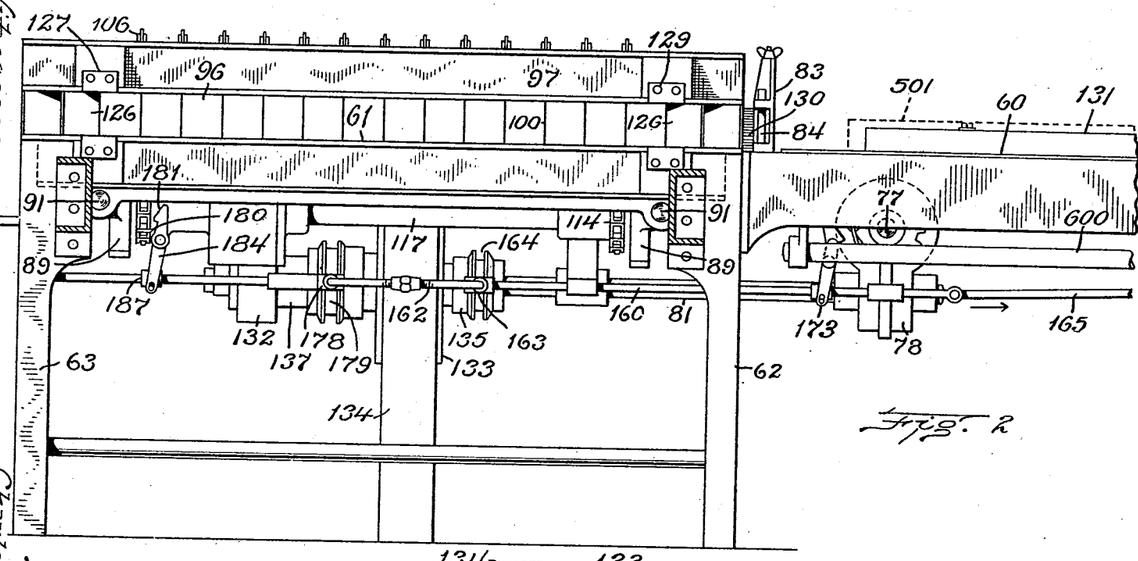
Fig. 2 is a front elevation thereof and the adjoining end of the longitudinal table, omitting the brackets for the receiving racks.
Figure 3:
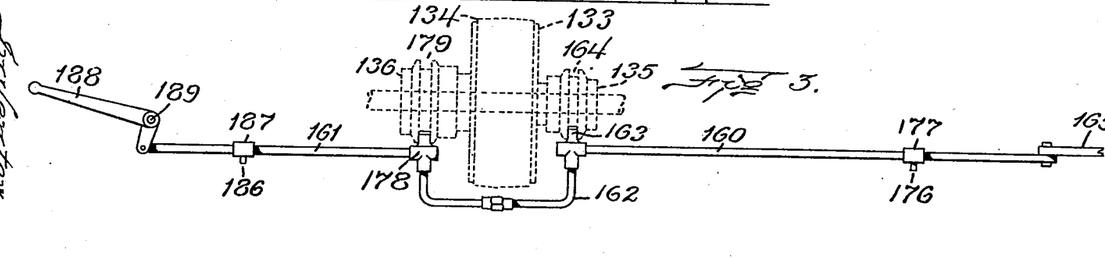
Fig. 3 is a top plan view of the clutch shipping mechanism.
Figure 14:
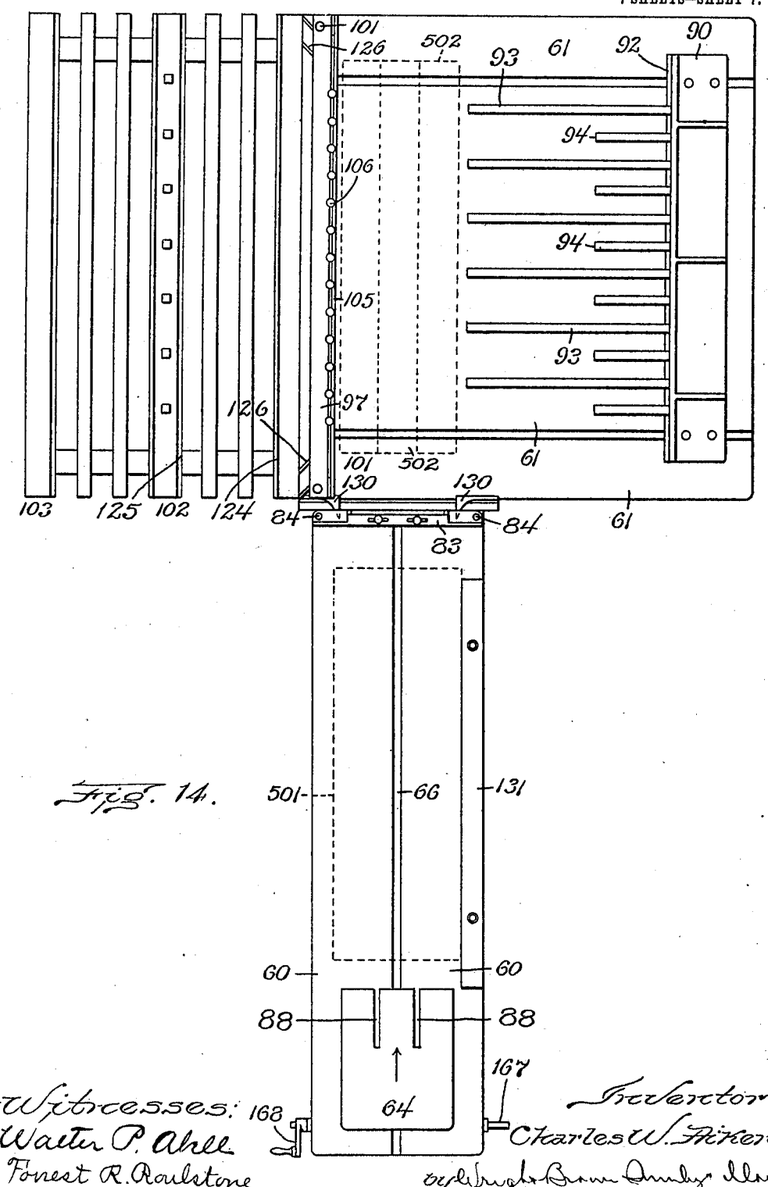
Fig. 14 is a top plan view of the surface plates of the cutting tables.

A block of soap having been cut in slabs 501 by a suitable slabbing machine is subdivided, one slab at a time, first into longitudinal strips, and the strips into cakes of commercial size. This is done by the method now commonly employed, that is, forcing the slab longitudinally on a horizontal table through a cutting head on which perpendicular wires are strung, and then forcing the strips so cut transversely through another cutting head of which the wires cut the strips in cakes. The longitudinal and transverse cutting tables, on which the soap receives an L-shaped motion, are best shown in Figs. 1, 2 and 14. The transverse cutting table is supported on side frame pieces 62 63, and one end of the longitudinal table, so called because the slabs 501 are advanced longitudinally thereon, is secured to the side 62 while the other end is supported by the legs 59. Thin metal plates 60 60 and 61 61 constitute the surfaces of the longitudinal and transverse cutting tables respectively.

Figures 6, 7:
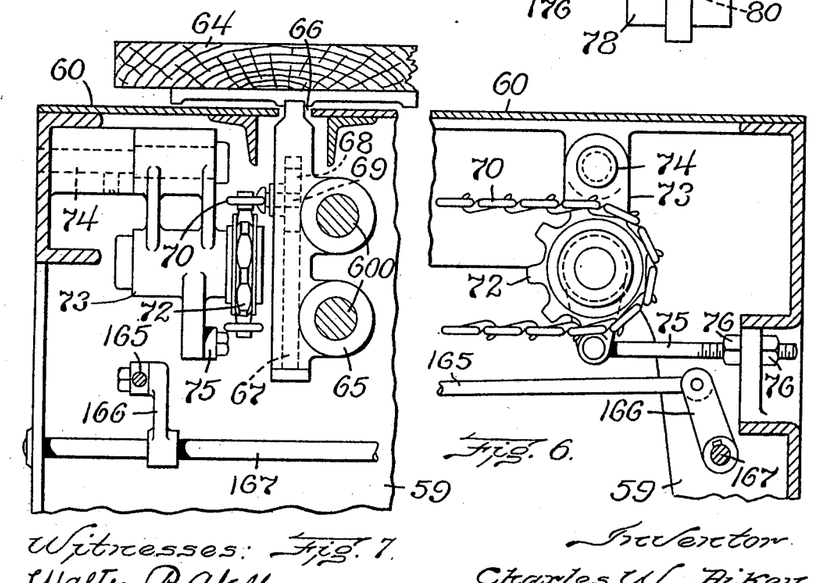
Fig. 6 is a vertical section of the opposite end of the longitudinal cutting table.
Fig. 7 is a cross section of that part shown in Fig. 6.

A slab 501 of soap is first laid longitudinally on the table 60 and advanced endwise onto the transverse table by means of a pusher 64 which abuts against the rear end of the slab. The pusher is mounted on the top of a horizontally movable carriage 65 which projects through a slot 66 formed by a space between plates 60 60. The carriage 65 is mounted and adapted to slide on two horizontal bars 600 600 stationarily mounted below and extending longitudinally of the table. A vertical undercut slot 67 is formed in the carriage and occupied by a roll 68 which is mounted on a lug 69 projecting laterally from one link of an actuator or conveyer chain 70. The said chain passes over a driving sprocket 71 and an idle sprocket 72, and when driven as hereinafter described, it reciprocates the carriage back and forth on the bars 600. The sprocket 72 is carried by a hanger 73 which is pivoted to the table by a stud 74. The lower end of the hanger is pivotally connected to a screw-threaded bolt 75 which projects through the end 59 and which is held by adjusting nuts 76 76 (see Figs. 6 and 7). By means of the bolt 75 the hanger may be swung on its pivot 74 to tighten or loosen the chain 70. The driving sprocket 71 is keyed upon a shaft 77 which extends through a gear case 78 and has a helical gear 79 within the case also keyed thereon. The gear 79 intermeshes with a helical gear 80 affixed upon a power shaft 81 which is driven as hereinafter described, to drive the actuating chain 70.

Figure 5:
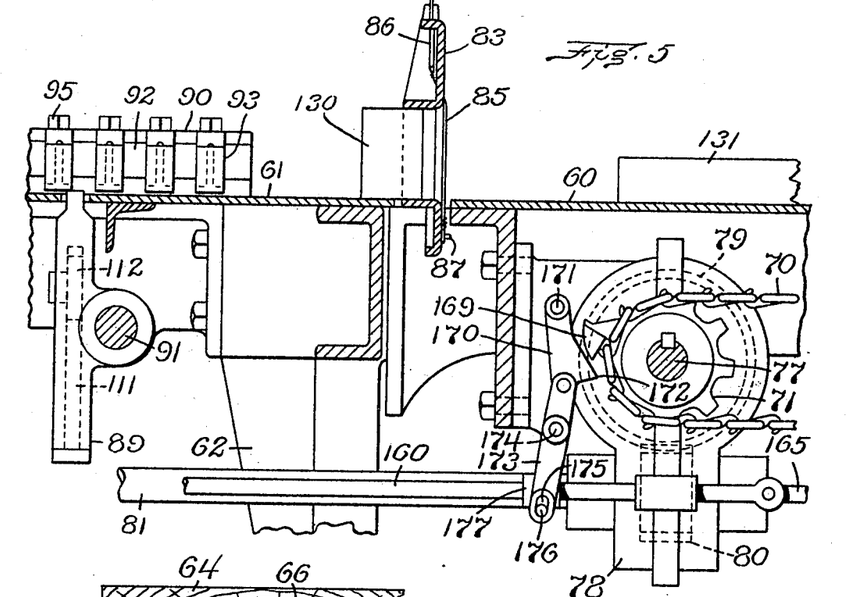
Fig. 5 is a longitudinal vertical section of the adjoining portions of the longitudinal and transverse cutting tables.

The pusher 64, when advanced by the chain 70 toward the transverse table 61, is adapted to project a slab of soap through the rectangular passage 82 in a cutting head 83 mounted on dowel pins 84 84 between the tables 60 and 61 (Figs. 1, 2 and 5). The head 83 supports cutting wires 85 85 of which the upper and lower ends are looped respectively upon adjusting screw hooks 86 86 and fixed pins 87 87. The cutting head shown is provided with two of the wires 85 which, when the slab of soap is projected through the head, split the same into three strips 502, as seen by dotted lines in Fig. 14. The pusher 64 is provided with incisions 88 88 which register with the wires 85 85 and permit the intervening portions to project through the head 83 to advance the strips of soap well onto the table 61.

The surface plates 61 of the transverse table are three in number and are separated sufficiently to permit the two carriages 89 89 located below to project therebetween to support a finger-rail 90 above the plates. The carriages 89 89 are similar to the carriage 65 of the longitudinal table and are reciprocated in unison upon horizontal bars 91 91. The finger-rail 90 has a dove-tailed flange 92 upon which a plurality of alternately long and short push-fingers 93 and 94 respectively, are adapted to slide and be clamped by pinch bolts 95. The push-fingers, when moved as hereinafter described, advance the strips of soap laterally through a rectangular opening 96 in a wide cutting head 97 having a plurality of cutting wires 100 strung on adjusting screw-hooks 98 and stationary pins 99. The head 97 is mounted on dowel-pins 101 101 from which it may be readily lifted for the purpose of removal. The strips of soap when projected by the push-fingers through the cutting-head 97 are cut in cakes 503 and deposited on receiving racks which comprise cross bars 102 and 103 so spaced as to be adapted to receive interposed bars 104 of portable racks (see Fig. 4).

Figure 12:
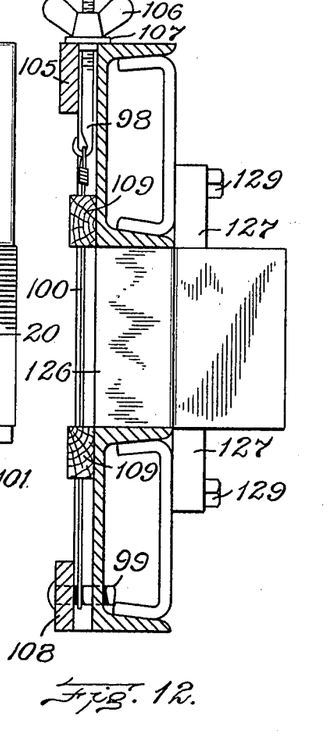
Fig. 12 is a vertical cross section thereof.
Figure 13:
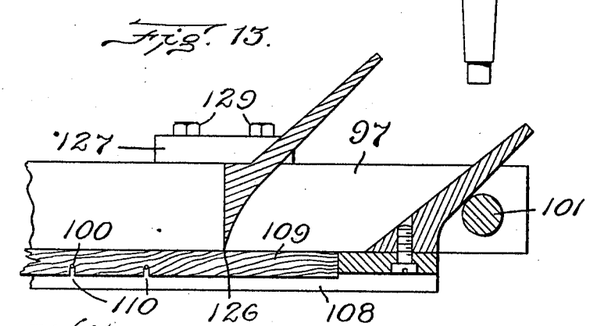
Fig. 13 is a sectional plan view on the line 20—20 of Fig. 11.

The screw-hooks 98 occupy a slot between the head 97 and a strip 105 affixed thereto and extend below said strip, and are free to be placed at any desired position therein to conform to the spaces between the cutting wires 100. Said hooks are provided with wing-nuts 106 and washers 107 which overlap the top edges of the head and the strip 105 so that by them the hooks may be drawn up to exert tension on the wires. The pins 99 around which the wires are looped are removably inserted in holes formed in the lower edge of the head 97 and a strip 108 affixed thereto and separated therefrom by a space sufficient for the insertion of the wires (see Fig. 12). For the sake of economy, each wire 100 is used double by connecting each end to one of the hooks 98 and inserting a pin 99 through the depending loop formed thereby. The spacing of the wires may be varied by changing the locations of the pins 99 and of the hooks 98. The wires are provided with spacing strips 109 109 which are removably attached to the head and provided with slots 110 through which the wires extend. It will be seen, therefore, that the desired spacing of the wires is maintained by the strips 109 109 having slots formed therein at predetermined intervals. As the inner ends of the hooks are below the strip 105, they are readily accessible for engagement of the wires therewith. Consequently by simply pulling out a pin 99, a doubled wire may be quickly removed and another applied, either similarly spaced or differently spaced according to the spacing of the slots in the strips 109 that are used.

Figure 4:
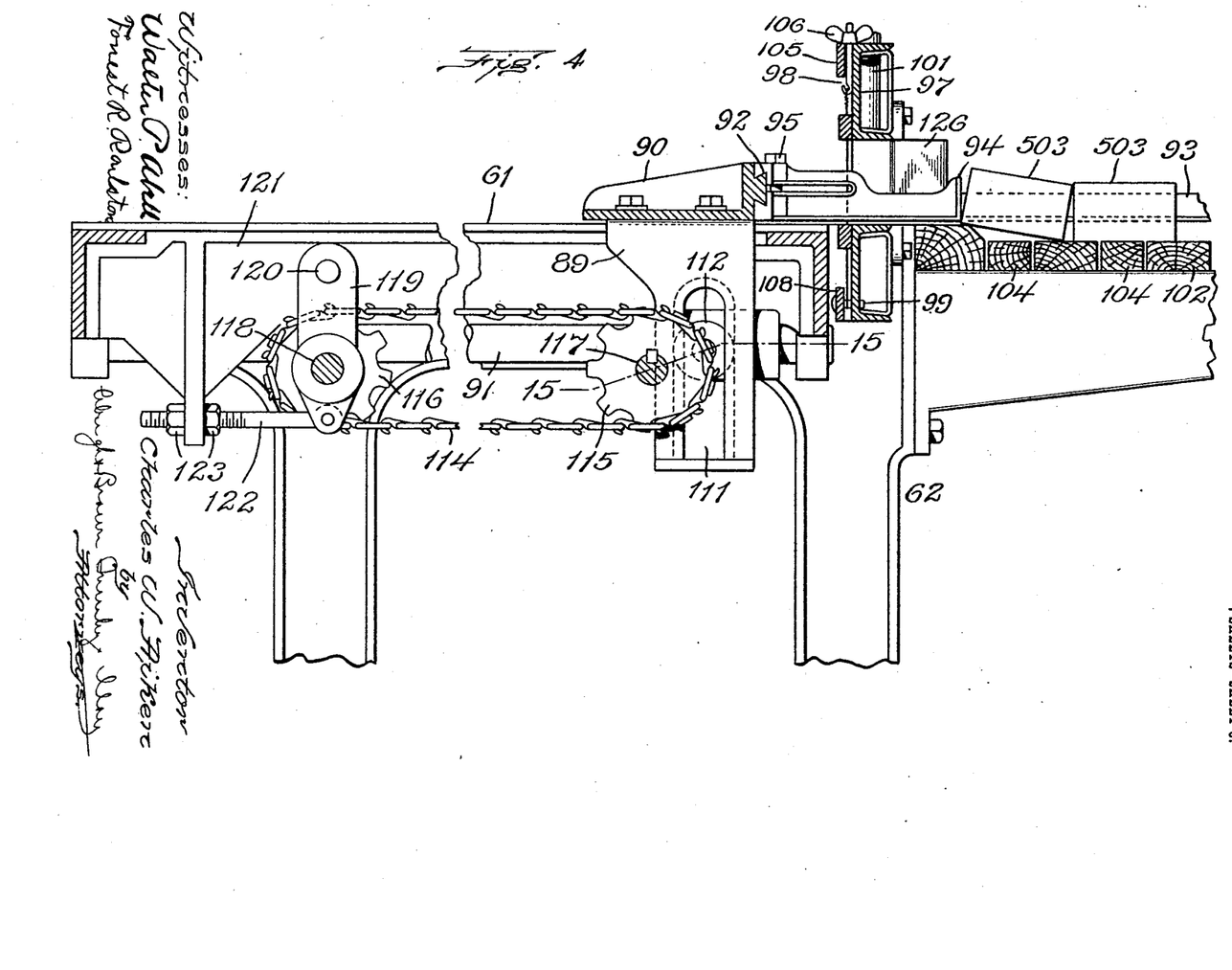
Fig. 4 is a vertical section of the transverse cutting table, portions being broken away.
Figure 8:
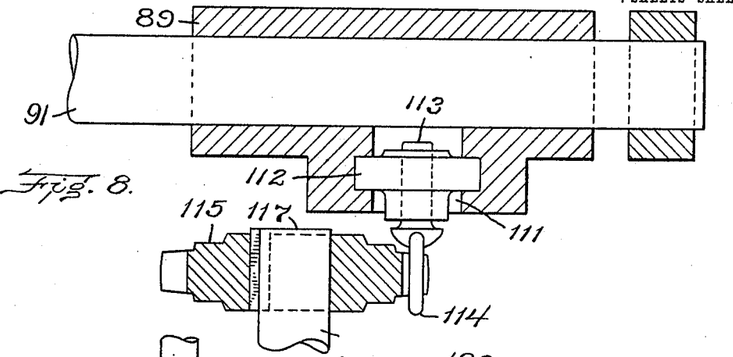
Fig. 8 is a sectional plan view on the line 15—15 of Fig. 4.

The carriages 89 89 have vertical undercut slots 111 111 which contain rollers 112 112. The rollers are mounted on cylindrical lugs 113 113 which project laterally from links forming parts of actuators or conveyer chains 114 114 (see Figs. 4 and 8). Said chains run upon sprockets 115 115 and 116 116 of which the former are keyed upon a driving shaft 117 and the latter upon an idle shaft 118 whose ends are journaled in oscillatory adjustable hangers 119 119. The hangers are pivoted upon studs 120 120 which project from the horizontal bed portion 121 of the table, and are adapted to be adjusted by means of screw bolts 122 to take up slack in the chains 114 114. One end of each bolt 122 is pivotally connected to a hanger 119 and the other end extended through a web of the frame piece 121 and clamped thereto by adjusting nuts 123. The carriages 89 89 and finger rail 90 when advanced toward the cutting head 97 cause the long push-fingers 93 to abut against the intervening strips of soap and project them through the head. Continued movement of the finger-rail causes the long fingers, after having advanced the strips beyond the wires, to advance each alternate file of cakes 503 against which said fingers abut, leaving the intervening files of cakes to be subsequently advanced by the short fingers 94 when they project through the head. In this way the alternate files of cakes advanced by the long fingers are deposited on the receiving rack 103 and those advanced by the short fingers are deposited on the rack 102. The level of the receiving racks is somewhat below that of the cutting table and of two cross-beams 124 and 125, of which the former separates the racks from the table and the latter separates the racks from each other. The edges of said beams are beveled as shown in Figs. 1 and 4 so that the passage thereover of the cakes is eased and not obstructed thereby. The object in so arranging the receiving racks is to cause the cakes to separate themselves by reason of the tilting position each cake assumes in passing over the beams 124 and 125. To prevent the files of cakes which are engaged by the short fingers from being advanced farther than desired, by cohesion with those which are advanced by the long fingers, I provide suitable stops 1250 rising from the beam 125 (see Figs. 1 and 14) in alinement with said short fingers. Said stops render it impossible for other than alternate files of cakes to reach the outer rack.

The head 97 is provided with trimming knives 126 126 which trim the ends of the strips 502 while the latter are being cut in cakes by the wires 100. Said knives have ears 127 127 and slots 128 128 through which screw bolts 129 129 extend to clamp the ears to the head. By reason of the slots 128 128 the knives are adapted to be laterally adjustable relatively to the cutting wires, so that the size of the end cakes may be made to conform to that of the rest. The cutting head 83 is also provided with trimming knives indicated at 130 130, which trim the surplus soap from the slab 501 as it passes through the head. These trimming knives 130 have outwardly curved portions, as shown in Fig. 14, which deflect the surplus soap laterally to a distance that will prevent the trimmed off portions from adhering to the strips of the proper width which pass through the cutting head. For guiding the slab to the head 83, the table 60 is provided with a rail 131 extending longitudinally thereon. If one edge of the slab is placed against the rail when it is laid on the table, it is thereby alined with the rectangular passage 82 in the head.

Referring now to the driving mechanism for the conveyer chains 70 and 114, it will be seen by Figs. 1 and 2 that one end of the power shaft 81 is journaled in a gear case 132, and the other end in the case 78 as heretofore stated. A pulley 133 driven by a belt 134, is loosely mounted on said shaft between the gear cases, and coöperates with suitable clutch mechanisms such as those conventionally shown on the drawings and hereinafter briefly described.

The shaft is provided with two tight collars, not shown, for the purpose of preventing axial movement of the pulley thereon. The ends of the hub of the pulley are adapted to be operatively engaged by friction clutches 135 and 136 on the shaft, one on each side of the pulley. The clutch 135 is splined, and the clutch 136 is loose on the shaft, both being free to be moved axially toward or from the hub of the pulley so as to operatively engage or release the same. It will be apparent, therefore, that through the clutch 135, the shaft 81, and the spiral gears 79 and 80, rotation may be imparted to the shaft bearing the driving sprocket 71. The means for controlling the clutch 135 is hereinafter described, following the description of the power transmission for the chains 114 114.

Figures 9, 10:
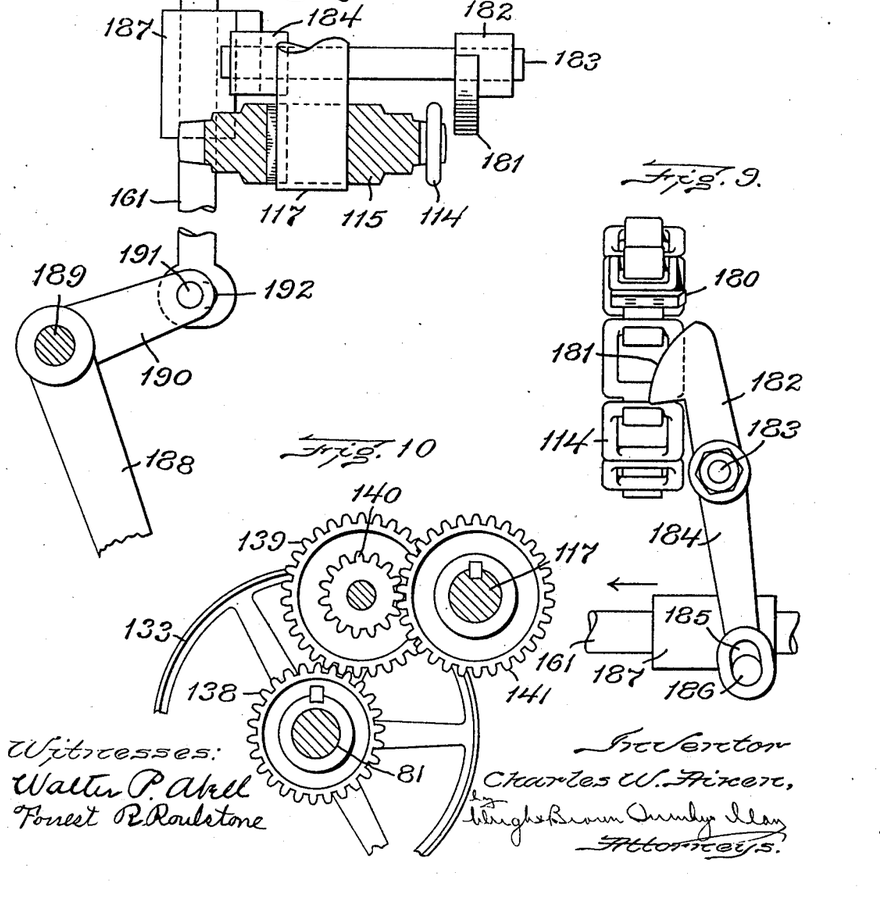
Fig. 9 is an elevation of one of the shipper levers and its actuator.
Fig. 10 shows the gearing by which power is applied to the main shaft.
Figure 11:
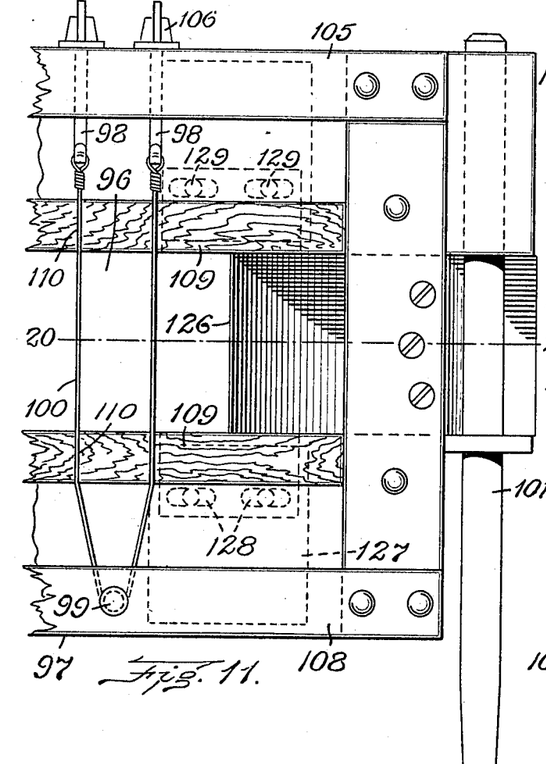
Fig. 11 is an elevation of one end of the transverse cutting head.

The clutch 136 is splined on one end of a sleeve 137 which is loose on the shaft 81 and of which the other end is inclosed in the gear case 132. A pinion 138 formed on said sleeve within the case serves as one of a train of transmission gears 139 140 and 141 of which the latter is keyed upon the sprocket shaft 117, which also extends through said case. By reference to Figs. 2 and 10 it will be apparent that when the clutch 136 is operatively engaged with the hub of the pulley rotation may be transmitted through the sleeve 137, the gears 138 139 and 140 which is rigidly connected to the gear 139, the gear 141 and the shaft 117, to the driving sprockets 115 115.

The clutches 135 and 136 are controlled by automatic mechanism which is best illustrated in Figs. 2, 3, 5, 8 and 9. A shipperrod which is made in two parts 160 and 161, one on each side of the pulley 133, is connected by a yoke 162 which makes it practically integral. The part 160 carries a shipper 163 which projects into a peripheral groove 164 on the clutch 135, and is pivotally connected to one end of a pitman 165. The other end of the pitman is connected to an arm 166 rigidly mounted on a rock-shaft 167. The rock-shaft extends through both sides of the end 59 of the cutting-table, and is provided with a crank-handle 168 which may be mounted on either end thereof (see Figs. 6, 7 and 14). By means of the handle, the clutch 135 may be moved into or out of operative engagement with the hub of the driving pulley. The rod 160 is adapted to be moved in one direction by an inclined member 169 on one of the links of the chain 70 (see Fig. 5). Said member is adapted to actuate a lever 170 which is hung on the gear case 78 by means of a stud 171. The lever has a nose 172 which hangs in the path of the member when the clutch 136 is engaged, and is pivotally connected to one end of a lever 173 fulcrumed between its ends on a stud 174 projecting from the case 78. The other end of the lever 173 is provided with a radial slot 175 which is occupied by a stud 176 projecting from a collar 177 affixed upon the rod 160. The arrangement of the parts included in the foregoing description is such that when the handle 168 is moved to effect the driving of the chain 70, the nose 172 is moved into the path of the member 169. Then continued movement of the chain causes the pusher 64 to deposit the soap upon the plates 61 in position to be subsequently engaged by the push-fingers 93 and 94, and the member 169 actuates the levers 170 and 173 and the shipper rod in the opposite direction. The extent of movement imparted by the lever 170 to the shipper-rod is such as to not only disengage the clutch 135, but to move it back beyond its initial position. The part 161 of the shipper-rod carries a shipper 178 which projects into a peripheral groove 179 in the clutch 136, so that when the clutch 135 is disengaged by the projection 169, the clutch 136 is moved into operative engagement. By reason of so engaging the clutch 136, the driving of the two chains 114 114 is effected, and so the soap on the transverse table is advanced through the head 97. The arrangement of the clutches is such that when the shipper-rod is midway between the extremes of its movement, neither one is operatively engaged with the hub of the pulley and the latter is free to rotate alone. When, however, the rod is in the position shown by Fig. 2, the clutch 135 is engaged and the clutch 136 released, but when the rod is moved as far as possible in the direction of the arrow in that figure, the clutch 135 is released and the clutch 136 engaged. Therefore, since the clutches are simultaneously shifted, the automatic operation of one pushing means is effected simultaneously with the discontinuance of the operation of the other pushing means.

One of the chains 114 is provided with a member 180 (Figs. 2 and 9) which is adapted to effect the release of the clutch 136 when the finger rail 90, having advanced toward the cutting-head 97, returns to its initial position as shown by Fig. 1. Said member is a plate overlapping the side of one of the links of the chain, and is adapted to engage the nose 181 of an arm 182 and actuate the same to oscillate the rock-shaft 183 on which said arm is rigidly mounted. The rock-shaft is mounted in a bearing formed on the gear-case 132, and on its rear end is rigidly mounted a depending arm 184. Said arm has in its lower end a radial slot 185 which is occupied by a stud 186 projecting from a collar 187 affixed upon the shipper-rod. By reference to Fig. 9 it will be seen that as the member 180 descends, it is adapted to engage and displace the arm 182 and so move the shipper to the left as indicated by the arrow. The effect of so moving the shipper-rod is to release the clutch 136 and leave the shipper-rod in its middle or initial position.

Without reviewing the entire operation of the cutting machine, it is apparent that after it is once set in motion by the manually-operative handle 168, the automatic clutch-controlling mechanism effects, first, a discontinuation of movement of the strip-cutting mechanism, second and simultaneously therewith, the operation of the cake-cutting and depositing mechanism, and third, the discontinuation of all operation of the machine.

For the sake of convenience, the shipper-rod 160 is provided with an actuating lever 188 connected to its other end. Said lever is mounted on a stud 189 and has an integral arm 190 from which a stud 191 projects into a slot 192 formed in the end of the member 161. It is therefore apparent that the machine may be manually started or stopped by either of the actuating levers 168 and 188.

The manner of stringing the cutting-wires of the head 97 makes them adapted to be readily adjustable to positions at different intervals, and the manner of mounting the heads 83 and 97 on dowel pins renders them easily removable so that other interchangeable heads may be substituted therefor. It might be desirable in some instances to substitute a head having wires placed at other predetermined intervals rather than reset those of the head already in place.

The terms and phraseology used in this specification are only for the purpose of description and should not be so interpreted as to limit the invention, for there are many parts which might be conveniently varied without departing from the spirit and scope of the invention.

I claim:—

1. A soap-cutting machine comprising a longitudinal table, a transverse table at one end of the first table, a cutting-head interposed at the junction of the tables, a transverse cutting-head at one end of the transverse table, a pusher adapted to transfer soap from the first table, through the interposed head to the transverse table, a pusher for pushing the deposited soap through the transverse head, an actuator for reciprocating the first pusher, an actuator for reciprocating the transverse pusher, a driving member adapted to drive both actuators, manually-operative controlling means adapted to be moved back or forth from initial position to form driving connection for either one of said actuators and simultaneously disconnect the other; means actuated by the first actuator for reversing said controlling means, and means actuated by the transverse actuator for restoring the controlling means to initial position.

2. A soap-cutting machine comprising a table, a pair of parallel endless actuators, a pair of reciprocatory carriages, one adjacent each of said actuators, guides for said carriages extending parallel to the actuators, means for driving the actuators uniformly in one direction, means connecting each actuator to its adjacent carriage and adapted to move relatively to the carriage, whereby reciprocatory motion is imparted by said actuator to its carriage, and means supported by said carriages adapted to engage and move soap lying on said table.

3. A soap-cutting machine comprising a table, a cutter-head having adjustably spaced cutting wires, a pusher rail, means for supporting the rail and reciprocating the same laterally, a plurality of fingers carried by said rail and adapted to engage and move soap lying on said table, said fingers being individually movable along the rail, and means for fastening each of said fingers independently to the rail.

4. A soap-cutting machine having a cutting-head comprising a movable frame having an opening for the passage therethrough of soap, a plurality of cutting wires extending across said opening, and means on said frame for holding said wires at variably spaced intervals, said means being adapted to apply a variable tension to each wire, and having wire-engaging hooks in exposed positions.

5. A soap-cutting machine having a cutting-head comprising a frame, an opening in the frame for the passage therethrough of the soap, a series of fixed members supported by the frame on one side of said opening, a series of cutting-wires looped over said fixed members and their ends extending across said opening to the opposite side thereof, and a series of adjusting members mounted on the frame and connected to the ends of the wires and adapted to draw the wires tight and to be moved toward or from each other when not subjected to tension of the wires.

6. A soap-cutting machine having a cutting-head comprising a frame, an opening in the frame for the passage therethrough of the soap, a series of holes in the frame in a row extending along one side of said opening, a plurality of removable members adapted to be inserted in any of said holes, a series of cutting-wires having all their ends extending in one direction across said opening and their middle portions looped over said removable members, a slot in the frame extending substantially parallel to said row of holes and on the opposite side of said opening, and a series of adjusting members arranged and normally free to be moved back or forth in said slot and adapted to be connected to the ends of the wires and to draw the same tight across said opening and to be firmly held against movement in said slot by the tension of the wires.

7. A soap-cutting machine having a cutting-head comprising a frame, an opening in the frame for the passage therethrough of the soap, a series of cutting wires, means for supporting said wires so that they extend across said opening, said supporting means comprising a series of removable pins at one side of said opening and a series of adjustable hooks in exposed positions at the other side of the opening and adapted to support the wires at various intervals relatively to each other, and to vary the tension of the wires, and two detachable members adapted to be attached one on either side of said opening and each having a series of incisions adapted to be occupied by said wires and to maintain predetermined intervals between the same.

8. A soap-cutting machine having a flat table for the soap, and a receiving rack for the soap comprising a series of stationary cross bars of which the inner edges of the outer members are beveled and of which the intermediate members have upper surfaces in a plane lower than that of the outer members.

9. A soap-cutting machine having a table for the soap, and a plurality of receiving racks in juxtarelation to and in series with the table, said racks comprising stationary separating cross-bars which separate the racks from the table and from each other, and intermediate stationary cross-bars supported between said separating bars so that their upper surfaces are in a plane lower than that of the separating bars the edges of the separating bars which are adapted to be engaged by the soap as it passes thereover being formed with beveled faces.

10. A soap-cutting machine comprising a table, a carriage movable longitudinally of said table and having a pusher connected therewith, said carriage having a vertical undercut slot, a roll occupying said slot, an endless actuating chain having a lug projecting laterally from it, the roll being mounted on said lug, and means for operating said chain.

11. A soap-cutting machine comprising a table, a removable cutting-head having a plurality of cutting wires, dowel-pin connections between the head and frame of the machine, and means for pushing the material to be cut.

12. A soap-cutting machine comprising a table having parallel slots, a pusher mounted on said table, two carriages connected through said slots with the pusher and having vertical undercut slots, endless actuator chains parallel with the path of movement of the carriages, a roller connected to each chain, the two rollers fitting said undercut slots, and means for operating the actuator chains.

13. A soap-cutting machine comprising a table, a receiving rack, a cutting-head between the table and rack, and trimming knives at the ends of the cutting-head, said knives having deflecting portions to direct the surplus material aside.

14. A soap-cutting machine comprising a table, a receiving rack, a cutting-head between the table and rack, and trimming knives at the ends of the cutting-head, said knives having deflecting portions to direct the surplus material aside, the table having a guiding rail nearly in alinement with one of the trimming knives.

In testimony whereof I have affixed my signature, in presence of two witnesses.

CHARLES W. AIKEN.

Witnesses:
C. H. MEEDS,
JOHN J. DOOLEY.